United States Patent [19]
Karabinis

[11] Patent Number: 5,111,484
[45] Date of Patent: May 5, 1992

[54] ADAPTIVE DISTORTION CANCELLER

[75] Inventor: Panagiotis D. Karabinis, Atkinson, N.H.

[73] Assignee: Raytheon Company, Lexington, Mass.

[21] Appl. No.: 686,217

[22] Filed: Apr. 16, 1991

[51] Int. Cl.$^5$ .............................................. H04B 1/10
[52] U.S. Cl. ...................................... 375/94; 375/101
[58] Field of Search ........................ 375/12, 13, 14, 94, 375/101, 102, 99; 333/18; 364/724.19, 724.2

[56] References Cited

U.S. PATENT DOCUMENTS

| | | | |
|---|---|---|---|
| 4,564,952 | 1/1986 | Karabinis et al. | 375/101 |
| 4,905,254 | 2/1990 | Bergmans | 375/94 |
| 5,020,078 | 5/1991 | Crespo | 375/14 |
| 5,031,194 | 7/1991 | Crespo et al. | 375/101 |

OTHER PUBLICATIONS

"Adaptive Equalization of Channel Nonlinearities in QAM Data Transmission Systems," D. D. Falconer, Bell System Technical Journal, Sep. 1978, vol. 57, No. 7, pp. 2589-2611.

"Adaptive Cancellation of Intersymbol Interference for Data Transmission," A. Gersho and T. L. Lim, Bell System Technical Journal, Nov. 1978, vol. 60, No. 9, pp. 1997-2021.

"Adaptive Cancellation of Nonlinear Intersymbol Interference for Voiceband Data Transmission," E. Biglieri, A. Gersho, R. D. Gitlin and T. L. Lim, IEEE Journal on Selected Areas in Communications, Sep. 1984, vol. SAC-2, No. 5, pp. 765-777.

*Primary Examiner*—Stephen Chin
*Attorney, Agent, or Firm*—Christopher L. Maginniss; Richard M. Sharkansky

[57] ABSTRACT

An adaptive distortion cancellation algorithm minimizes intersymbol interference (ISI) when demodulating signals in the presence of distortion over fading and dispersive channels. The algorithm computes preliminary estimates of received data and feeds them to a canceller structure. The canceller checks the preliminary estimates and then makes a series of subsequent estimates by modifying the elements of the original received estimated data sequence. Each estimate generates a distortion cancellation quantity which is added to the received data estimate to generate a sequence of values; a final decision is determined by that subsequent estimate which is closest to an ideal state. The preliminary estimates are made using a conventional transversal filter whose coefficients are controlled by one of the existing filter tap algorithms. The canceller algorithm corrects all incorrect elements of the preliminary estimates while maintaining relatively small error magnitudes at its output as compared to the transversal filter output error magnitudes.

10 Claims, 6 Drawing Sheets

ADAPTIVE DISTORTION CANCELLER

BACKGROUND OF THE INVENTION

The present invention relates generally to high-speed data transmission and, more particularly, to a method for adaptively reducing linear and nonlinear distortion in a digital communications channel.

During the past thirty years, there have been extensive efforts put forth seeking new techniques for combatting the intersymbol interference (ISI) in data transmission over band-limited channels. Adaptive equalization has been the major technique that has allowed a substantial increase in attainable transmission rate. Linear fractionally spaced equalizers have been used in systems having phase distortion in the channel to eliminate virtually all ISI without increasing the noise level. When amplitude distortion is present in the channel, however, adaptive linear equalizers inevitably provide noise enhancement. Decision-feedback equalization has been shown to offer somewhat improved performance when amplitude distortion is present.

In a typical digital communications system the transmitted data elements assume values from an alphabet of symbols. In such a system, irrespective of the modulation format being used, each received data sample, referred to as the observable, following the demodulation process, comprises a composite of the transmitted data symbol which has been affected by frequency independent channel attenuation or gain, intersymbol interference that may have been generated by a variety of system imperfections, and Gaussian thermal noise. In general, the value of ISI at each sampling time will depend on the overall system characteristic, i.e., its impulse response, and on a finite length data sequence which includes the observable as one of its elements, and whose length is determined by the memory of the system. Assuming a linear system, the dependency of the ISI on the elements of this data sequence is a linear one. However, for the nonlinear system, this relationship becomes nonlinear.

In a process for cancelling the system-induced distortion, the objective is to add a noiseless cancellation term to the observable which does not enhance the variance of thermal noise already present in the received waveform. Distortion cancellation has been disclosed in the prior art for linear and nonlinear systems using various canceller embodiments. In each such disclosure, a preliminary estimate of the data sequence is used to generate the value of the cancellation term. This preliminary estimate of the sequence, however, is used blindly and is not questioned in any way regarding the possibility of containing erroneous components. Clearly, since the cancellation term is dependent on the system characteristic and on the data sequence, errors in the estimations of this sequence will result in an estimated distortion cancellation term which will not, in general, be equal to the desired value. Therefore, given that errors have been made in estimating the data sequence, there will exist a cancellation term error with a magnitude depending, in general, on the number of errors made and on the system characteristic prevailing at the time the errors were made. Thus, it is seen that the performance of a canceller as disclosed in the prior art will degrade.

SUMMARY OF THE INVENTION

It is therefore a primary object of the present invention to provide an apparatus and method for use in a digital communications system for estimating received data states.

It is a further object of the present invention to provide improved adaptive distortion cancellation in such a system.

It is a still further object of the present invention to provide improved adaptive distortion cancellation in a digital communications system having a communications channel which is susceptible to linear and nonlinear distortions.

In accordance with these and other objects, there is disclosed herein a method for use in a digital communications system having a channel susceptible to linear and nonlinear distortions. The method is for identifying the state of an observed data element from among a set of states. The method comprises the steps of: receiving a preliminary sequence of data elements, the preliminary sequence including the observed data element; estimating the states of each of the data elements of the preliminary sequence; generating, for each of a plurality of cancellation coefficients corresponding to a plurality of data sequences having states which map closely adjacent to the states of the preliminary sequence, the value of the observed data element modified by the cancellation coefficient; determining, for each value of the modified data elements, a closest state from among a mapping of the set of states; measuring, for each value of the modified data elements, the error quantity resulting from the difference between the modified data element and the closest state; and assigning to the observed data element the closest state of the determining step for which the measured error quantity results in a minimum value.

With this arrangement, there is provided an adaptive distortion cancellation process that can be used in the receiver of a digital communications system to cancel ISI without increasing the noise level already present in the received signal. The process is similar to prior art techniques in that it uses preliminary decisions to form noiseless ISI estimates. It is, however, substantially different in its decision-making strategy in that it makes a series of subsequent estimates by modifying the elements of the preliminary estimate and selecting that estimate which provides a minimum error distance from an ideal state. As a consequence, it is more resilient to preliminary decision errors in comparison to the prior art techniques.

BRIEF DESCRIPTION OF THE DRAWINGS

The foregoing features of the present invention, and the advantages thereof, may be fully understood from the following detailed description, read in conjunction with the accompanying drawings, wherein.

DESCRIPTION OF THE PREFERRED EMBODIMENT

Figure 1:
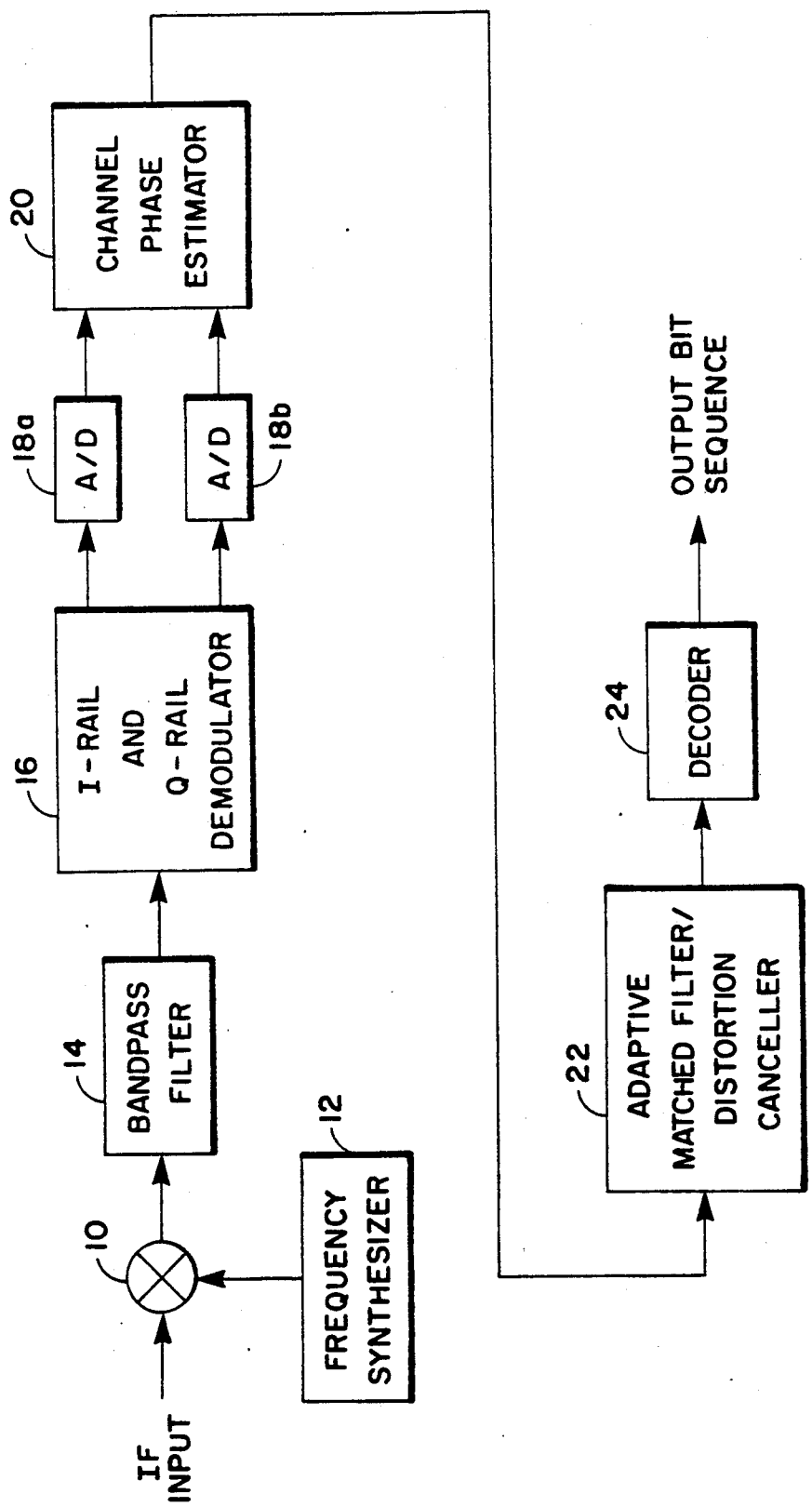
FIG. 1 is a block diagram of a portion of the receiver circuitry of a data communications system wherein the present invention finds application.

Referring to FIG. 1, there is shown a block diagram including a portion of the receiver circuitry of an illustrative data communications system. The embodiment disclosed herein relates particularly to a system which employs quadrature amplitude modulation (QAM) as the modulation scheme. It is well-recognized that this scheme uses bandwidth efficiently, but is quite fragile with regard to distortion.

In the illustrated circuitry, a received QAM signal, which has been down-converted to an intermediate frequency (IF) level, is combined in mixer 10 with a signal generated by frequency synthesizer 12, which signal may typically be a spread spectrum, frequency dehopping signal. The IF dehopped signal output from mixer 10 is coupled to bandpass filter 14 to remove the spurious frequency components which may be introduced by the mixing process. The filtered QAM signal is then coupled to demodulator 16 which down-converts the IF signal to baseband, while separating the in-phase (I-rail) and quadrature-phase (Q-rail) components of the signal. Each signal rail output from demodulator 16 is coupled to an analog-to-digital (A/D) converter 18a, 18b, each of which periodically samples the corresponding demodulated output and converts it to a digital output, each comprising, typically, an eight-bit signal.

The converter outputs are coupled to channel phase estimator 20 which compares the signals from the A/D samplers 18a, 18b and, based on a priori knowledge of the data sequences or the preambles of each frame, estimates the channel phase, to thereby initially set the coefficients of the adaptive filters at the onset of each frame.

The output of estimator 20 is coupled to adaptive matched filter/distortion canceller 22, in which the present invention resides. This device performs the operations by which each received data symbol is identified. Assuming that the transmitted data has been encoded in some manner, the string of data symbols from canceller 22 is coupled to decoder 24, which may illustratively include a convolutional decoder or a block decoder, e.g., a Reed-Solomon decoder, or a combination of the two, and the resulting output bit sequence comprises usable data.

In order to more fully understand the present invention, the next several paragraphs describe a generalized process of data symbol estimation which includes many of the features included in prior art systems and disclosures. Consider a digital communications system in which the $n^{th}$ transmitted data element is denoted by $A_n$. Furthermore, assume that new data elements are periodically transmitted, and that each data element assumes values from an alphabet comprising L elements, i.e., $A_n$ is an element of the set of $\{a_1, a_2, \ldots, a_L\}$ for all n. In such a system, irrespective of the modulation format being used, the $n^{th}$ receiver sample, following the demodulation process, may be represented by the following generic form:

$$R_n = A_n \xi_n + I_n + N_n,$$

where $R_n$ represents the $n^{th}$ received sample, referred to as the observable, $\xi_n$ denotes frequency independent channel attenuation or gain, $I_n$ represents the intersymbol interference (ISI) that may have been generated by a variety of system imperfections, and $N_n$ denotes Gaussian thermal noise. Clearly, in an ideal system, it is expected that $\xi_n = 1$ and $I_n = 0$ for all n, and the variance of $N_n$ is as small as possible, approaching the matched filter limit.

In general, the value of ISI at the $n^{th}$ sampling time, $I_n$, will depend on the overall system characteristic, i.e., its impulse response, and on a finite length data sequence, $\{A_n\}_{-M}^{N}$, which includes $A_n$ as one of its elements, and extends M symbol periods before $A_n$ and N symbol periods after $A_n$. Thus the set $\{A_n\}_{-M}^{N}$ is defined as follows:

$$\{A_n\}_{-M}^{N} = \{A_{n-M}, A_{n-M+1}, \ldots, A_{n-1}, A_n, A_{n+1}, \ldots, A_{n+N}\},$$

where the length of $\{A_n\}_{-M}^{N}$ is determined by the memory of the system. Assuming a linear system, the dependency of $I_n$ on the elements of $\{A_n\}_{-M}^{N}$ is a linear one. However, for the nonlinear system, this relationship becomes nonlinear. For a linear system, the attenuation/gain parameter, $\xi_n$, will depend only on the system characteristic, while, for a nonlinear system, $\xi_n$ will also depend in some nonlinear fashion on the elements of $\{A_n\}_{-M}^{N}$.

In a process for cancelling the system-induced distortion, the objective is to add a noiseless term to the observable $R_n$ such as to force $\xi_n A_n + I_n$ to become $A_n$ without enhancing the variance of thermal noise already present in the received waveform. That is, it is desired to find a cancellation parameter C such that $$R_n + C = \xi_n A_n + I_n + N_n + C = A_n + N_n.$$

The above equation implies that the distortion cancelling term, C, must assume the value of $$C = A_n(1 - \xi_n) - I_n.$$

Distortion cancellation has been disclosed in the prior art for linear and nonlinear systems using various canceller embodiments. In each such disclosure, a preliminary estimate of the data sequence $\{A_n\}_{-M}^{N}$ is used to generate the value of C. This preliminary estimate of $\{A_n\}_{-M}^{N}$, however, is used blindly and is not questioned in any way regarding the possibility of containing erroneous components. Clearly, since C is dependent on the system characteristic and on $\{A_n\}_{-M}^{N}$ (since, in general, $\xi_n$ and $I_n$ are), errors in the estimations of $\{A_n\}_{-M}^{N}$ will result in an estimated distortion cancellation term, $C'$, which will not, in general, be equal to C (the desired value). Therefore, given that errors have been made in estimating $\{A_n\}_{-M}^{N}$, there will exist $$C' = C + \epsilon; \quad |\epsilon| \geq 0,$$

with the magnitude of $\epsilon$ depending, in general, on the number of errors made and on the system characteristic prevailing at the time the errors were made. Subject to the above hypothesis, the performance of a canceller as disclosed in the prior art will degrade.

Figure 2:
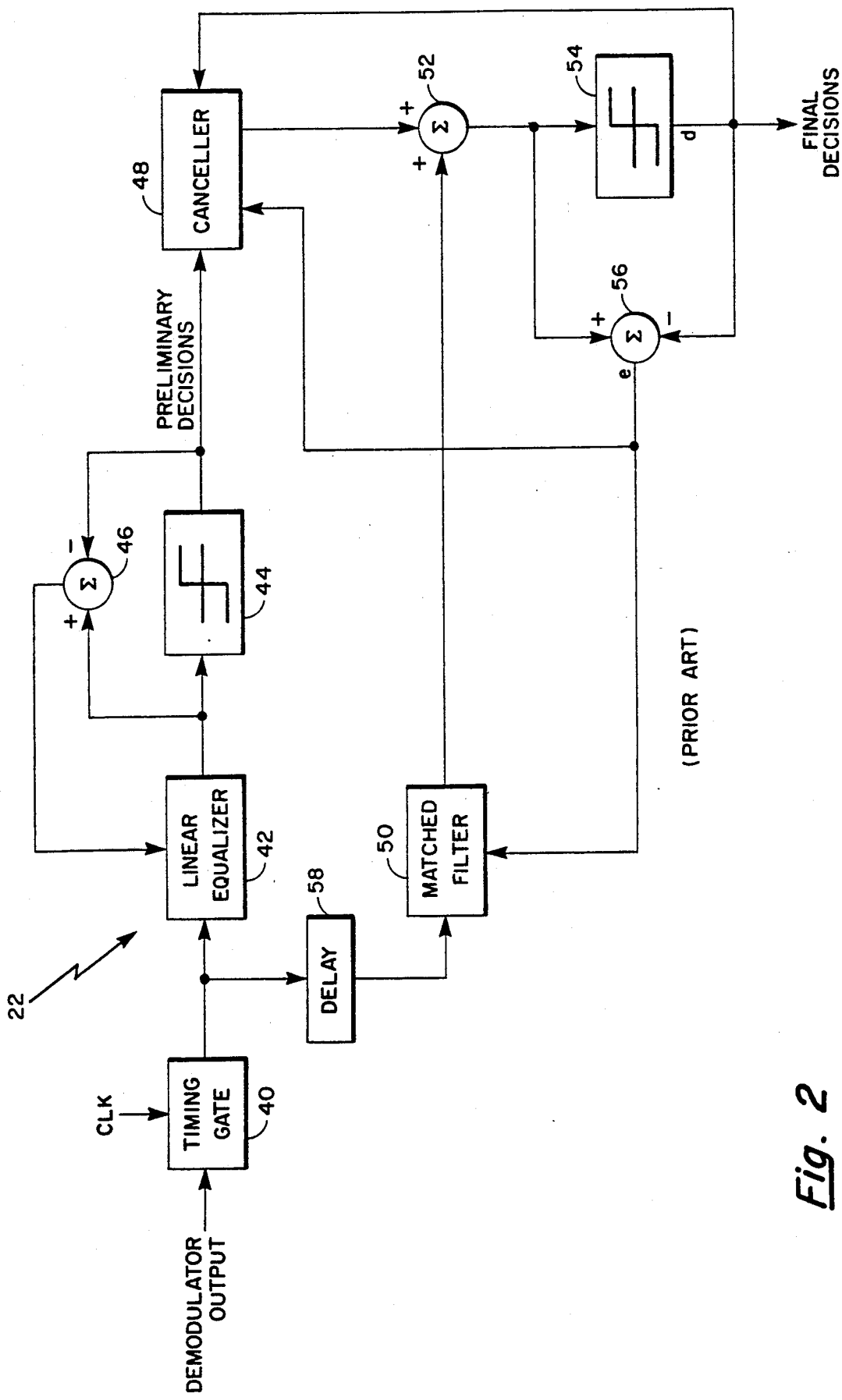
FIG. 2 is a block diagram of an apparatus for adaptive cancellation of nonlinear intersymbol interference according to the prior art.

The basic architecture of an adaptive matched filter/distortion canceller 22 of the receiver circuitry of FIG. 1 is shown in greater detail in FIG. 2. This, as well as other closely related prior art variations thereof, have been used as the means for cancelling intersymbol interference (ISI). The linear equalizer 42 shown in this receiver is used to provide preliminary estimates of the transmitted data symbols, which estimates are subsequently used by a canceller structure 48 to adaptively form the prevailing ISI estimate. The ISI estimate, thus formed, is subtracted from the output of the matched filter 50, producing a quantity which is substantially free of intersymbol interference, which then serves as the basis for forming a final decision regarding the corresponding transmitted symbol value.

In accordance with a more detailed description of the adaptive matched filter/distortion canceller 22 of FIG. 2, the demodulator output is sampled by a timing gate 40, whose output is coupled to a preliminary estimator which comprises a linear equalizer 42, a device for assigning the symbol having the closest fit to the data output from linear equalizer 42, commonly referred to as slicer 44, and summing device 46. These elements combine to derive an initial estimate of the finite length data sequence $\{A_n\}_{-M}^{N}$. The output of timing gate 40 is also coupled to delay element 58, which may typically comprise a shift register arrangement. Delay element 58 serves to delay the signaling epochs with respect to the initial estimate sequence comprising the preliminary decisions. The output of delay element 58 is coupled to matched filter 50 which serves to optimize the signal-to-noise ratio of the data signals passing therethrough.

Canceller 48 responds to the sequence of preliminary decisions from slicer 44 to generate a distortion cancellation coefficient; this coefficient is combined in summing device 52 to modify the output of matched filter 50. The modified data signal thus generated is fed through slicer 54 to generate a final decision by making a best fit to the set of ideal data points. The error signal generated by summing device 56, which is the difference between the output of summing device 52 and the ideal data point of the final decision, is fed back to matched filter 50 and canceller 48 to adaptively adjust their coefficients.

The prior art ISI canceller of FIG. 2 is quite flexible and lends itself to ISI cancellation resulting from arbitrary combinations of linear and/or nonlinear system impairments, provided that an appropriate configuration/architecture exists within canceller 48. For a type of system containing a nonlinearity at the transmitter, e.g., a nonlinear power amplifier, followed by a linearly dispersive, or multipath fading, channel, the ISI in the received data stream will, in general, contain a linear as well as a nonlinear component. The linear ISI component is defined by a linear combination of transmitted data symbols, while the nonlinear ISI term reflects a nonlinear combination of the transmitted data elements. Given a channel memory of N symbol (baud) intervals, canceller 48 must process a sequence of N preliminary decisions per signaling interval and be able to form from such a sequence the necessary linear and/or nonlinear symbol combinations reflecting the currently received ISI as it exists at the output of matched filter 50.

The signal processing methodology for ISI cancellation described in relation to FIG. 2, has been described as providing receiver data processing with a performance approaching that of the isolated pulse matched filter bound. Admittedly, so long as the preliminary decisions provided by linear equalizer 42 are correct, the performance of the combination of canceller 48 and matched filter 50 does approach that bound. However, if the preliminary decisions are correct, there is no need for the canceller/matched filter combination. The belief that, so long as only a small number of errors occur in the preliminary decisions, the canceller should still be capable of providing near optimum performance, since most of the symbols used in forming the ISI estimates are still correct, may not always be true, particularly when the ISI is strongly dependent on a relatively small number of symbols, some of which are represented in error by the preliminary decisions. As an example, for the line-of-sight multipath fading channel, considerable canceller degradations brought about by a relatively small number of errors made by the preliminary estimator have been observed. This is a consequence of the ISI being strongly dependent on a relatively small number of transmitted symbols.

In accordance with the principles of the present invention, the scope of the function of canceller 48 is extended by the disclosure of a process by which checks on the original estimate of $\{A_n\}_{-M}^{N}$ may be performed, and, if appropriate, substituting a better estimate. Given an original estimate of $\{A_n\}_{-M}^{N}$, a series of subsequent estimates may be made by modifying the elements of the original estimate of the sequence $\{A_n\}_{-M}^{N}$. Then, each new generated sequence of data elements may be used as an input to the canceller structure to yield a corresponding distortion cancellation quantity C. The value of each generated C may be added to the receiver observable, $R_n$, to generate a sequence of values of $R_n+C$. The one element of the $R_n+C$ sequence that is found closest in Euclidian distance, to an ideal element of the alphabet $\{a_1, a_2, \ldots, a_L\}$ may be used to determine the best canceller estimate of $A_n$. That is, the one element of the $R_n+C$ sequence found closest to an element of $\{a_1, a_2, \ldots, a_L\}$ will, most likely, correspond to a distortion cancellation coefficient C, which yields $R_n+C=A_n+N_n$.

In generating the various different estimates of the sequence $\{A_n\}_{-M}^{N}$ based on the original estimate of $\{A_n\}_{-M}^{N}$, only the "closest neighbors" of the elements of $\{A_n\}_{-M}^{N}$ need to be considered; this limitation is imposed in order to maintain a manageable number of possibilities to be examined, particularly when dealing with large signal constellations (e.g., 64 QAM).

Figure 7:
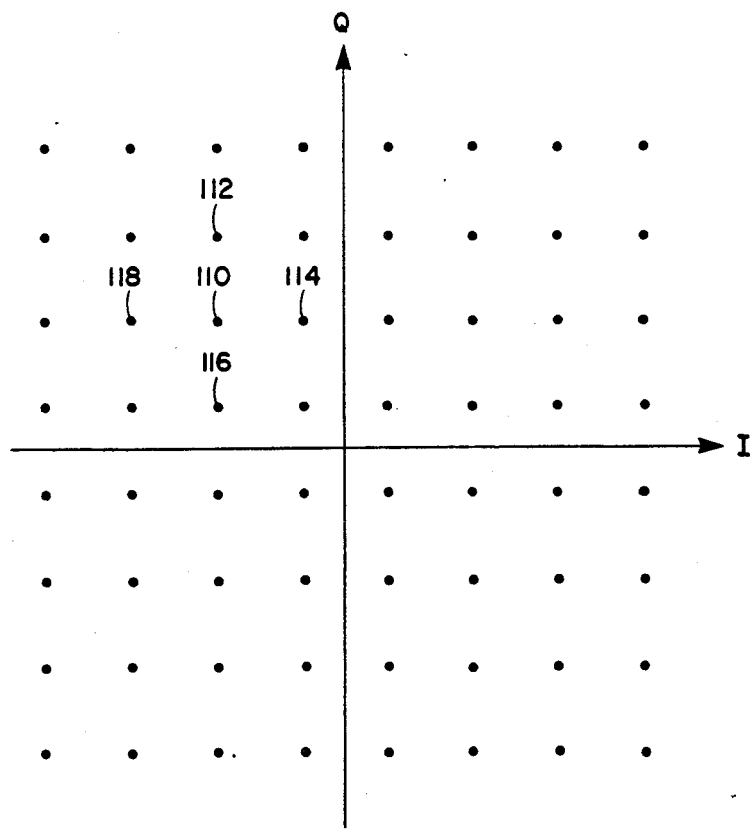
FIG. 7 is an illustrative mapping on the I- and Q-axes of the symbols of a QAM system.

Referring now to FIG. 7, there is shown a plot of the locations of the ideal signal amplitudes on the I- and Q-axes, for a QAM system having a constellation of 64 symbols. For an illustrative symbol located at position 110, the closest neighborhood symbols are those located at positions 112, 114, 116 and 118, as well as position 110 itself. Thus, it is seen that each symbol position may have as many as five closest neighborhood positions.

Figure 3:
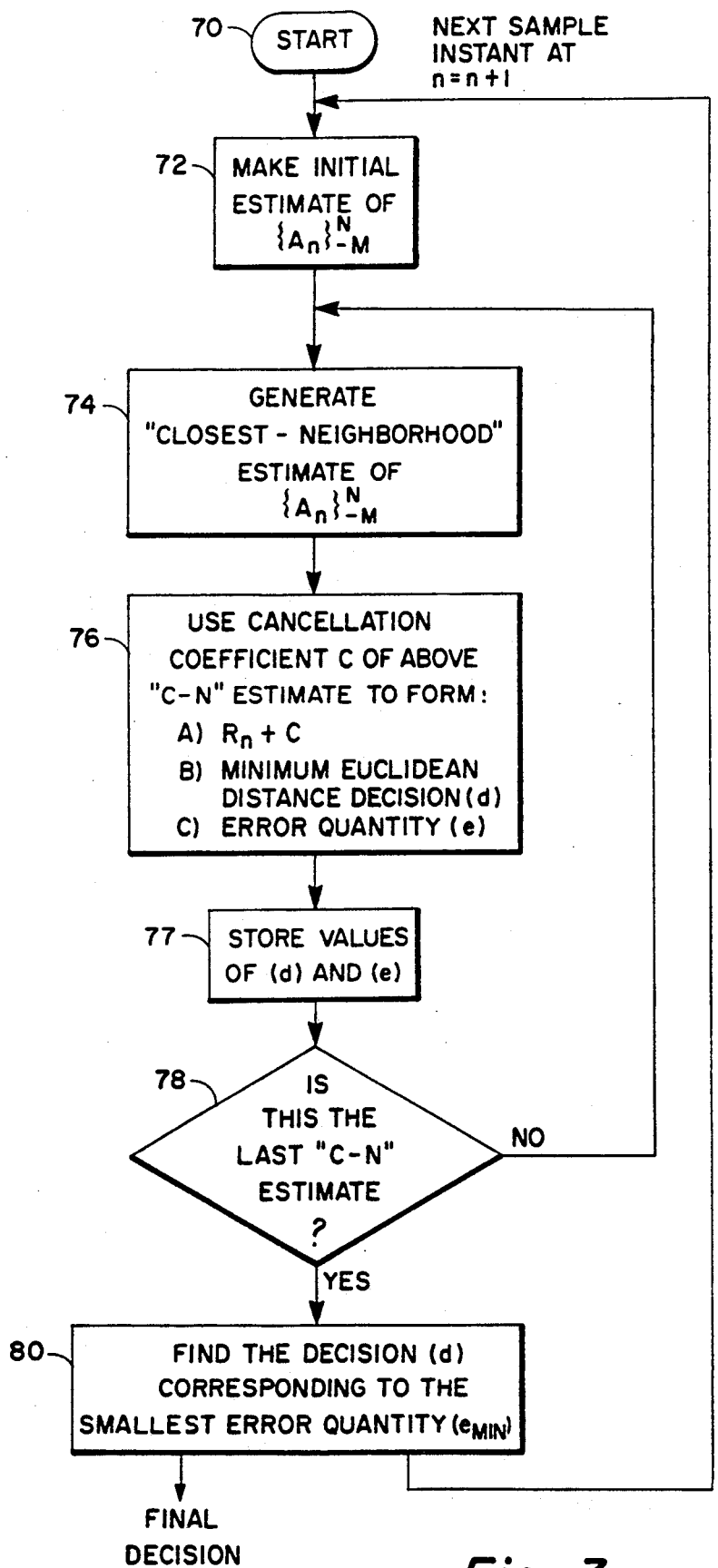
FIG. 3 is a flow diagram of a process for adaptive cancellation of nonlinear intersymbol interference according to the present invention.

The flowchart of FIG. 3 further illustrates the process outlined above. The process begins at starting point 70 and proceeds to process step 72 where an initial estimate of the sequence $\{A_n\}_{-M}^{N}$ is made. Based on this initial estimate, process step 74 generates a "closest neighborhood" estimate of $\{A_n\}_{-M}^{N}$. Each closest neighborhood estimate of $\{A_n\}_{-M}^{N}$ from step 74 has an associated distortion cancellation coefficient C stored in memory, and, at process step 76, this coefficient C is used to form (a) $R_n+C$; (b) the minimum Euclidean distance decision, d, based on $R_n+C$; and (c) the corresponding error quantity, e, based on the distance between $R_n+C$ and decision d. The values of d and e are stored in temporary memory at process step 77.

Decision step 78 determines whether all closest neighborhood estimates have been performed. If not, control returns to process step 74 where a next closest neighborhood estimate of $\{A_n\}_{-M}^N$ is generated; if all estimates have been performed, control passes to process step 80 where the one decision d, corresponding to the smallest magnitude of error quantity e, is retrieved. This decision d then becomes the final decision output from the canceller, and control returns to process step 72 where the process continues with the next data sample $A_{n+1}$ at the next sampling instant.

The speed of operation of the process of FIG. 3 may be enhanced by a parallel arrangement whereby process steps 74 and 76 are duplicated so that a plurality of closest neighborhood sequences are examined simultaneously. If the number of parallel paths provided is equal to the total number of sequences to be examined, process steps 77 and 78 may be eliminated.

Figure 4:
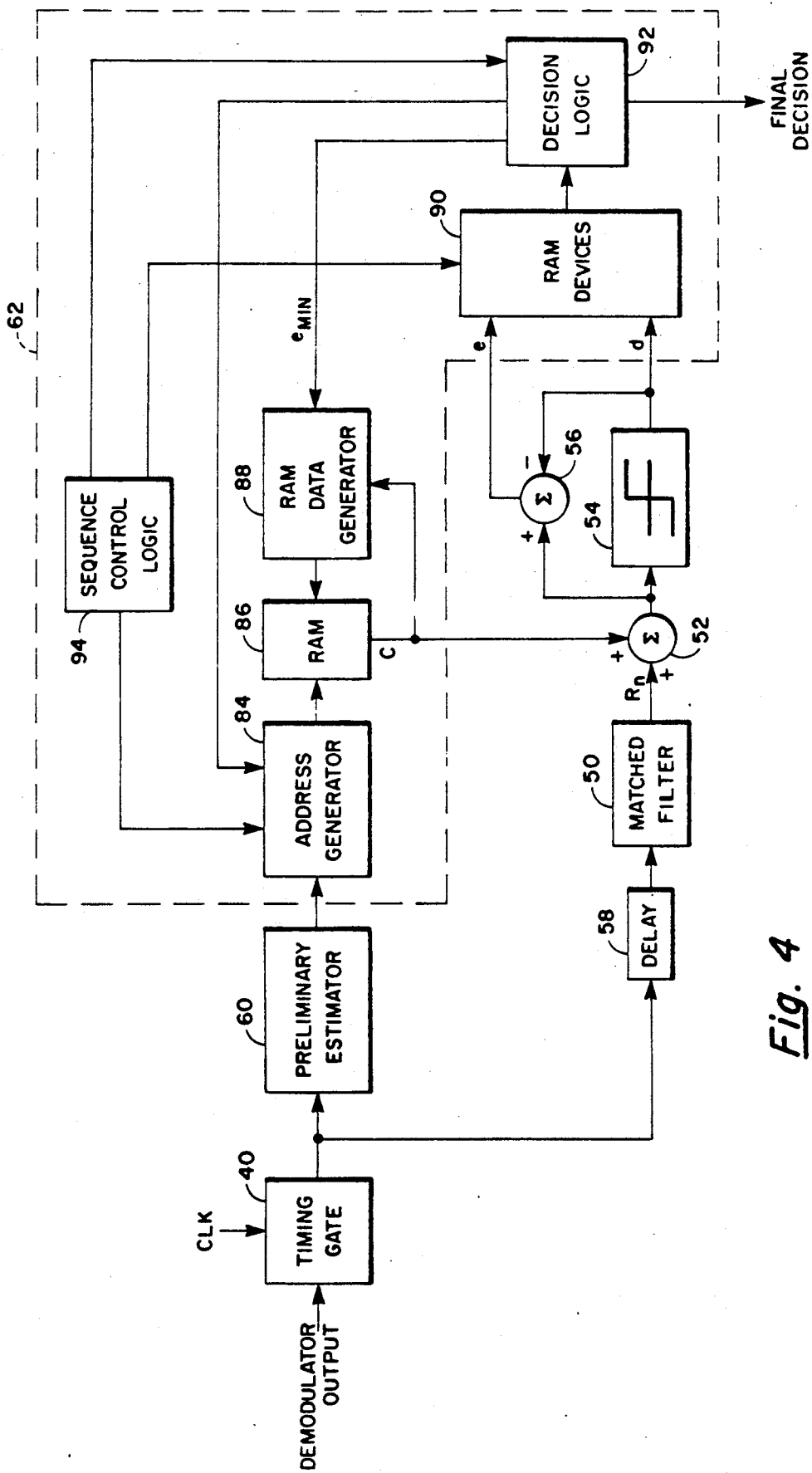
FIG. 4 is a block diagram of an apparatus for implementing the process of FIG. 3.

Referring now to FIG. 4, there is shown a block diagram for implementing the process of FIG. 3. This embodiment includes several elements shown also in FIG. 2; the basic difference lies in canceller 62, which incorporates the process of FIG. 3. The elements of canceller 62 operate generally under the control of sequence control logic 94, which may illustratively be a microprocessor. Sequence control logic 94 serves to control the timing and flow of data among the elements of canceller 62.

The demodulator output is sampled by a timing gate 40, whose output is coupled to preliminary estimator 60 which, like devices 42, 44 and 46 of FIG. 2, derives an initial estimate of the finite length data sequence $\{A_n\}_{-M}^N$. Preliminary estimator 60 may illustratively comprise a nine-tap, synchronously spaced, transversal filter. The output of timing gate 40 is also coupled to delay element 58, which may typically comprise a shift register arrangement. Delay element 58 serves to delay the signaling epochs appearing as $R_n$ with respect to the data output from preliminary estimator 60, thus providing values for $A_{n+1}$, $A_{n+2}$, etc., in advance of the observable $R_n$. The output of delay element 58 is coupled to matched filter 50 which, like its counterpart in the embodiment of FIG. 2, optimizes the signal-to-noise ratio of the data signals passing therethrough.

For the type of channel and system considered here, the extent of ISI has, to a large degree of accuracy, been found not to exceed ± two baud intervals about any given signaling epoch. Thus, corresponding to the $n^{th}$ signaling interval, the transmitted sequence $$\{A_n\}_{-2}^2 = \{A_{n-2}, A_{n-1}, A_n, A_{n-1}, A_{n+2}\},$$

in conjunction with the channel characteristic, defines the ISI that exists within the corresponding receiver observation. As a consequence, in the preferred embodiment, transversal filter 60 provides a preliminary estimate of $\{A_n\}_{-2}^2$, a sequence of length five. The preliminary estimate of $\{A_n\}_{-2}^2$ is then used by address generator 84 to define a "closest neighborhood" region that involves, at most, $5^5 = 3125$ distinct possibilities for the sequence $\{A_n\}_{-2}^2$. This is true since, for QAM signaling, a given constellation point has, at most, four nearest neighbors, including the collaterally adjacent points and excluding the diagonally adjacent points. In the interest of minimizing complexity, however, and in light of the fact that the distortion is strongly dependent on the $A_{n-1}$, $A_n$, $A_{n+1}$ elements, with weak dependency on the elements $A_{n-2}$ and $A_{n+2}$, it has been found that the process of the present invention provides adequate results when restricted to consider only a subset of all nearest neighbors of the original estimate of $\{A_n\}_{-2}^2$. That is, in one variation of the present invention, all nearest neighbors of the set $\{A_n\}_{-1}^1$ are generated, and $A_{n+2}$ are used as originally estimated by transversal filter 60. Consequently, at each receiver sampling epoch, an estimate of $\{A_n\}_{-2}^2$ is made by transversal filter 60 and is used by address generator 84 to generate only $5^3 = 125$ nearest neighbors to the original sequence estimate.

These 125 distinct sequence possibilities are used sequentially to access the corresponding distortion cancellation coefficients from a RAM 86. As is described in relation to the flowchart of FIG. 3, each distortion cancellation coefficient, C, which is fetched from RAM memory 86, is added to the observable $R_n$ by summing device 52. The result of this addition is applied to slicer 54 which, in conjunction with summer 56, yields a decision d and a corresponding error quantity e. The 125 (e,d) twoples thus created are stored in temporary memory 90, shown as RAM devices, and, at the end of the baud interval, the decision associated with a minimum error magnitude $e_{MIN}$ is identified by the decision logic 92. This minimum error twople defines the system output in terms of a final decision on $A_n$. Furthermore, the identified minimum error twople serves as an index in identifying the particular sequence estimate and, hence, distortion cancellation coefficient that has given rise to it.

The distortion cancellation coefficient resulting in the minimum error twople is updated in accordance with $$C_{k+1} = C_k - \mu e_{MIN},$$

where $\mu$ is the algorithm step size, typically equal to one least significant bit of the arithmetic quantization of the system, and $e_{MIN}$ denotes the minimum error. This is implemented within the apparatus of FIG. 6 by the following steps. Once the minimum error twople has been determined, address generator 84 accesses the corresponding location in RAM 86, causing its distortion cancellation coefficient C to be applied to one input of RAM data generator 88. The coefficient is updated therein according to the above relationship using the value of $e_{MIN}$ being output from decision logic 92, and the adapted value of distortion cancellation coefficient is stored back in its corresponding memory location within RAM 86.

With regard to the size requirements of RAM device 86 containing the distortion cancellation values, for a channel and system of the type described herein and having a constellation of sixteen symbols, a sequence of length five is sufficient to define the distortion present at any one receiver sampling instant. Hence, in general, there will be $16^5 = 1,048,576$ distinct distortion possibilities. At first glance, therefore, it appears that there must be $16^5$ distinct memory locations within RAM device 86 to accommodate, in general, the $16^5$ distinct distortion possibilities. However, one-half of these distortion values will be the negatives of the remaining half, assuming a symmetrical QAM signal state constellation for any arbitrary linear and/or nonlinear channel condition. Hence, only $16^5/2 = 524,288$ distinct memory locations need to be provided in conjunction with the capability of changing the distortion cancellation coefficient sign external to RAM 86. If the above memory-based canceller requirement is still deemed prohibitive, it is considered within the scope of this invention to substitute a hardware-based canceller approach for RAM device 86 and the associated coefficient adaptation process depicted in FIG. 3. The overall process of FIG. 3, however, remains invariant relative to the strategy utilized in arriving at the final decisions.

Figure 5:
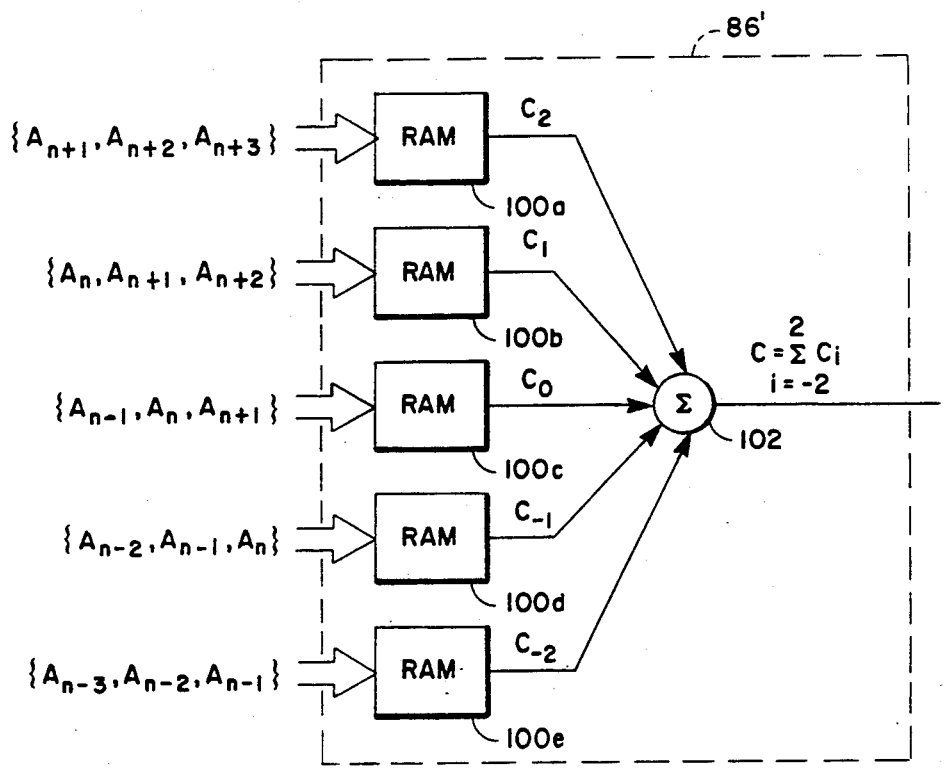
FIG. 5 is a detailed block diagram of a RAM configuration which may be used in the FIG. 4 apparatus.

Considering the purely memory-based canceller approach, it will be noted that a generally suboptimal configuration may be pursued, albeit one requiring substantially less memory capacity, whereby the single RAM device 86 of FIG. 4 is replaced by an arrangement 86' such as that shown in FIG. 5. In utilizing arrangement 86', it is assumed that at any one signaling instant the overall system impulse response for the general system where nonlinearities exist is strongly dependent on the currently transmitted data element, $A_n$, and on its two adjacent neighbors, $A_{n\pm 1}$. This assumption has been verified for the subject system.

Subject to this assumption and further postulating an overall system memory of five, RAMs 100a–100e, each containing $16^3/2=2048$ memory locations, may be configured as shown in FIG. 5 to replace the function of the single $16^5/2$ size RAM 86 of FIG. 4. RAM 100a receives elements $A_{n+1}$, $A_{n+2}$, and $A_{n+3}$ as addressing lines, and generates therefrom cancellation coefficient $C_2$. RAM 100b receives elements $A_n$, $A_{n+1}$ and $A_{n+2}$ as addressing lines, and generates therefrom cancellation coefficient $C_1$. RAM 100c receives elements $A_{n-1}$, $A_n$ and $A_{n+1}$ as addressing lines, and generates therefrom cancellation coefficient $C_0$. RAM 100d receives elements $A_{n-2}$, $A_{n-1}$ and $A_n$ as addressing lines, and generates therefrom cancellation coefficient $C_{-1}$. Finally, RAM 100e receives elements $A_{n-3}$, $A_{n-2}$ and $A_{n-1}$ as addressing lines, and generates therefrom cancellation coefficient $C_{-2}$. The five cancellation term components thus generated, $C_2$, $C_1$, $C_0$, $C_{-1}$ and $C_{-2}$, are summed by summer 102 to provide cancellation coefficient C. It will be noted that, for a purely linear system, the size of each of the five RAMs 100a–100e in FIG. 5 becomes $16/2=8$ or, in general, M/2, where M is the number of QAM constellation states.

For the purpose of investigating the capabilities of the distortion cancellation algorithm outlined above, a computer program was developed to simulate a 15 Mbaud, 16-state, QAM carrier system, where full-Nyquist pulse shaping at the transmitter has been assumed, with a roll-off factor of 0.45. Following the QAM modulation stage, a third order nonlinearity is imposed on the QAM waveform in order to model the effects of a transmitter power amplifier. The input/output characteristic of this nonlinearity is specified as $$v_o(t) = g_1 v_i(t-\tau_1) + g_2 v_i^2(t-\tau_2) + g_3 v_i^3(t-\tau_3),$$

where $v_i(t)$ and $v_o(t)$ denote the input and output signals, respectively, and the coefficients $g_2$ and $g_3$ are set in accordance with the degree of nonlinear distortion to be modeled in the system. The value of $g_1$ is always set to unity, with $\tau_1$, $\tau_2$, and $\tau_3$ representing delays. Following the transmitter amplifier stage, a fading line-of-sight radio link, i.e., the channel, is simulated, and propagation at a carrier frequency of 4 GHz is assumed. At the receiver baseband section, Gaussian thermal noise is added to the demodulated waveform, and the canceller embodiment of FIG. 4 is used in conjunction with the decision process presented above and outlined in FIG. 3. Preliminary estimates of the received data sequence are made using a conventional nine-tap, synchronously spaced transversal filter whose coefficients are controlled by the classical stochastic gradient LMS algorithm. Initially, a training sequence, i.e., known to the receiver, is used to achieve rapid convergence in the simulated transversal filter and canceller coefficients. Then, transmission of random data, i.e., unknown to the receiver, commences.

Figure 6:
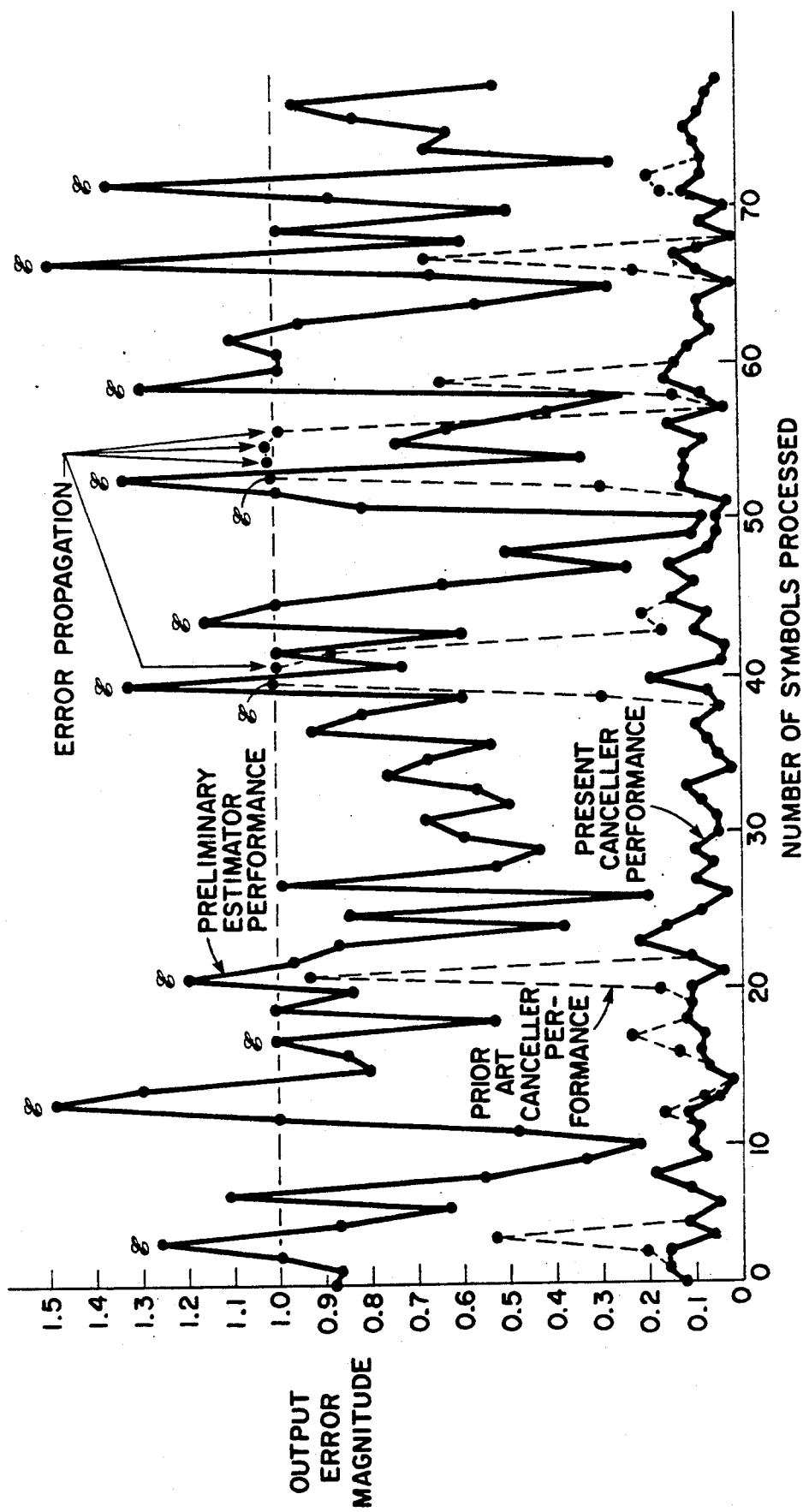
FIG. 6 is a graph demonstrating the performance of the process of FIG. 3 for a data communications system impaired by linear and nonlinear distortion.

Considering now some numerical results flowing from the above-described simulation, FIG. 6 illustrates performance for a system impaired by linear and nonlinear distortion with the nonlinearity characteristics and channel state defined as follows: $g_1=1$, $g_2=0$, $g_3=0.05$; $\tau_1=15$ nsec, $\tau_3=25$ nsec; the ratio of bit energy to noise power spectral density $E_b/N_o=27$ dB; linear channel distortion of 30 dB fade at $f=f_c+5$ MHz, where $f_c$ (carrier frequency)=4 GHz. The top trace of the FIG. 6 plot represents the performance of the transversal filter, i.e., the estimator, simulating 78 data points, with an E placed over a data point to indicate that an incorrect decision in received QAM constellation state has been made by the estimator.

The middle (dotted) trace in the plot of FIG. 6 illustrates how the canceller of FIG. 2 would have performed if it had been controlled by a prior art algorithm where the original set of preliminary estimates were used unequivocally without generating and examining "closest neighborhood" variations. In generating this middle trace, a decision feedback canceller mechanism was postulated whereby the output of the canceller was utilized in generating ISI estimates (see FIG. 2). Because of the assumed decision feedback canceller approach, it is seen that error propagation does occur at two different instances where the prior art canceller algorithm makes errors; at one of these instances it will be observed that the error propagated across three additional points.

The bottom trace of the plot of FIG. 6 illustrates the performance of the new canceller algorithm as described above in relation to FIG. 3, and as may be implemented by the embodiment of FIG. 4. In the computer simulation, this canceller algorithm corrected all incorrect decisions found in the preliminary estimates, while maintaining relatively small error magnitudes at its output, as compared to the transversal filter output error magnitudes (top trace).

Thus, an adaptive distortion cancellation process and structure have been described that can be used in the receiver of a digital communications system to cancel ISI without increasing the noise level already present in the received signal. The process is similar to prior art techniques in that it uses tentative decisions to form noiseless ISI estimates. It is, however, substantially different in its decision-making strategy and, as a consequence, is more resilient to tentative decision errors in comparison to the prior art methods. The new algorithm described herein is generic and can be used with a variety of canceller architectures in mitigating ISI caused by arbitrary combinations of linear and nonlinear system impairments.

While the principles of the present invention have been demonstrated with particular regard to the illustrated structure of the figures, it will be recognized that various departures from such illustrative structure may be undertaken in the practice of the invention. The scope of this invention is not intended to be limited to the structure disclosed herein but should instead be gauged by the breadth of the claims which follow.

What is claimed is:

1. In a digital communications system having a channel susceptible to linear and nonlinear distortions, a method for identifying the state of an observed data element from among a set of states, said method comprising the steps of:
   a. receiving a preliminary sequence of data elements, said preliminary sequence including said observed data element;
   b. estimating the states of each of said data elements of said preliminary sequence;
   c. generating, for each of a plurality of cancellation coefficients corresponding to a plurality of data sequences having states which map closely adjacent to the states of said preliminary sequence, the value of said observed data element modified by said cancellation coefficient;
   d. determining, for each value of said observed data element modified by said cancellation coefficient, a closest state from among a mapping of said set of states;
   e. measuring, for each value of said observed data element modified by said cancellation coefficient, the error quantity resulting from the difference between said value of said observed data element modified by said cancellation coefficient and said closest state; and
   f. assigning to said observed data element the closest state of said determining step for which said error quantity of said measuring step results in a minimum value.

2. The method according to claim 1 wherein said preliminary sequence of data elements comprises five data elements.

3. The method according to claim 2 wherein said observed data element comprises the third data element of said sequence.

4. The method according to claim 1 further including the final step of:
   g. altering the value of the cancellation coefficient corresponding to the data sequence from among said plurality of data sequences for which said measured error quantity results in a minimum.

5. The method according to claim 4 wherein said altering of said cancellation coefficient is made in proportion to the corresponding measured error quantity.

6. In a digital communications system having a channel susceptible to linear and nonlinear distortions, an apparatus for identifying the state of an observed data element from among a set of states, said apparatus comprising:
   means for receiving a preliminary sequence of data elements, said preliminary sequence including said observed data element;
   means for estimating the states of each of said data elements of said preliminary sequence;
   means for generating, for each of a plurality of cancellation coefficients corresponding to a plurality of data sequences having states which map closely adjacent to the states of said preliminary sequence, the value of said observed data element modified by said cancellation coefficient;
   means for determining, for each value of said observed data element modified by said cancellation coefficient, a closest state from among a mapping of said set of states;
   means for measuring, for each value of said observed data element modified by said cancellation coefficient, the error quantity resulting from the difference between said value of said observed data element modified by said cancellation coefficient and said closest state; and
   means for assigning to said observed data element the closest state from said determining means for which said error quantity results in a minimum value.

7. The apparatus according to claim 6 wherein said preliminary sequence of data elements comprises five data elements.

8. The apparatus according to claim 7 wherein said observed data element comprises the third data element of said sequence.

9. The apparatus according to claim 6 further including:
   means for altering the value of the cancellation coefficient corresponding to the data sequence from among said plurality of data sequences for which said measured error quantity results in a minimum.

10. The apparatus according to claim 9 wherein said altering of said cancellation coefficient is made in proportion to the corresponding measured error quantity.

* * * * *